United States Patent [19]
Steinman

[11] 3,735,874
[45] May 29, 1973

[54] VALVE AND FILTER ASSEMBLY
[75] Inventor: Bernard Steinman, New York, N.Y.
[73] Assignee: Mueller Steam Specialty Division of SOS Consolidated Inc., Brooklyn, N.Y.
[22] Filed: Aug. 11, 1971
[21] Appl. No.: 170,802

[52] U.S. Cl. .................210/430, 210/432, 210/447, 210/451
[51] Int. Cl. .............................................B01d 35/02
[58] Field of Search.....................................
210/429–432, 447, 451, 453

[56] References Cited
UNITED STATES PATENTS

| | | | |
|---|---|---|---|
| 1,776,456 | 9/1930 | Thompson | 210/431 |
| 1,393,555 | 10/1921 | Lockyer | 210/431 |
| 2,301,976 | 11/1941 | Schellens | 210/429 X |
| 1,116,689 | 11/1914 | Gehrke | 210/429 X |
| 1,898,816 | 2/1933 | Crossen | 210/431 |
| 2,431,057 | 11/1947 | Mainwaring | 210/432 |
| 1,188,371 | 6/1916 | Illg | 210/429 X |

Primary Examiner—Samih N. Zaharna
Assistant Examiner—Richard W. Burks
Attorney—Alex Friedman, Harold I. Kaplan and James K. Silberman

[57] ABSTRACT

A valve and filter assembly. The assembly has an elongated tubular structure defining a path of fluid flow and this tubular structure carries between its ends a valve seat surrounding the path of fluid flow. A valve member coacts with the valve seat and is moved to and from a closed position engaging the valve seat for controlling the fluid flow. A filter extends across the interior of the tubular structure for filtering the fluid flowing therethrough, and this filter has an upstream surface toward which the fluid flows and a downstream surface away from which the fluid flows after passing through the filter. In communication with the upstream surface of the filter is a collecting chamber into which filtered matter drops by gravity so as to be collected at a location beyond the path of fluid flow.

9 Claims, 1 Drawing Figure

PATENTED MAY 29 1973 3,735,874
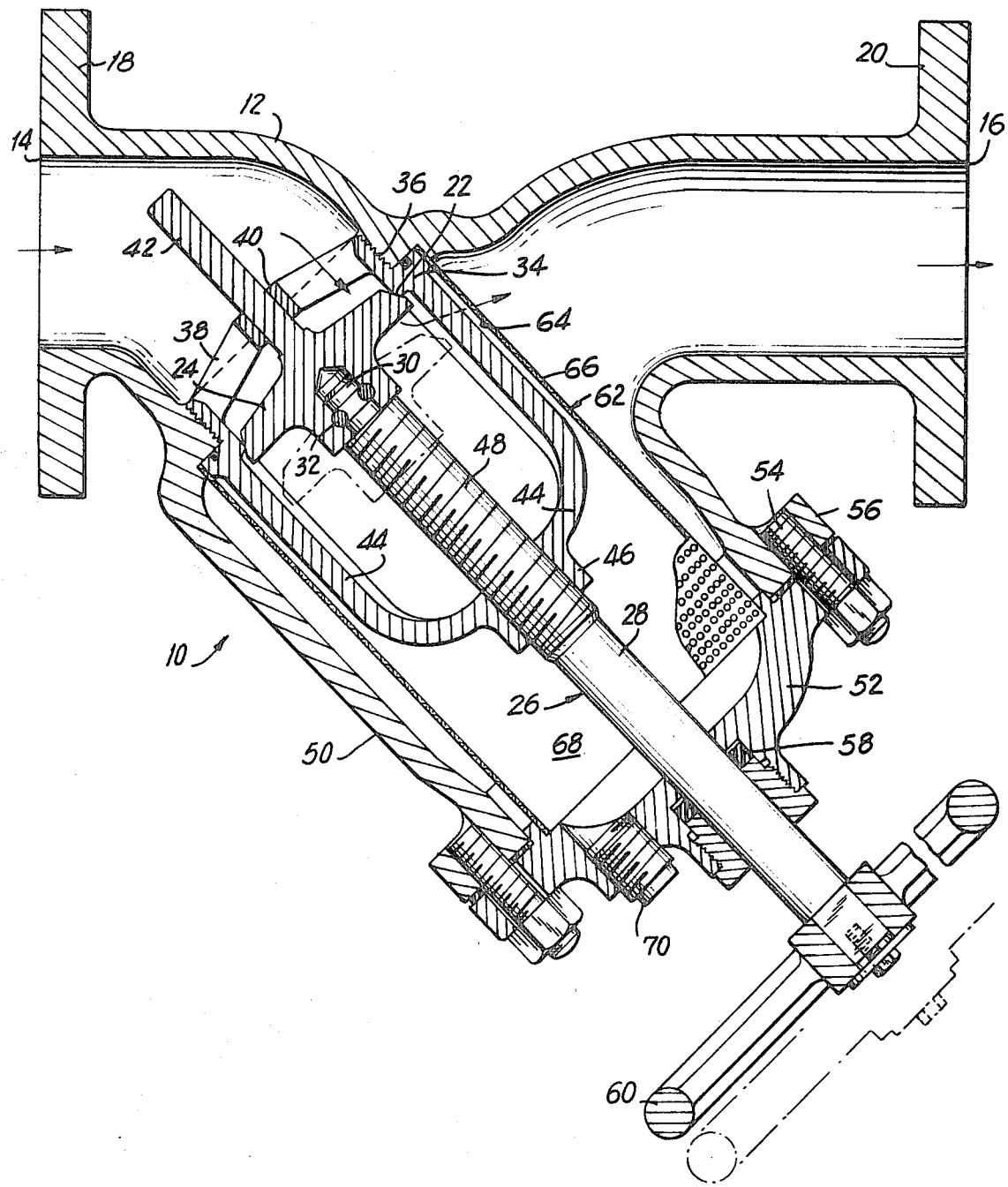
INVENTOR.
BERNARD STEINMAN
BY
Blum, Moscowitz, Friedman & Kaplan
ATTORNEYS

VALVE AND FILTER ASSEMBLY

BACKGROUND OF THE INVENTION

The present invention relates to valves.

In particular, the present invention relates to valves which are provided with filters for filtering fluid which flows through the valves.

Structures of this general type are already known. The filters of the conventional structures are generally of a tubular or cylindrical configuration taking the form of a perforated cylindrical wall or of a cylindrical screen mesh or the like, and these filter units are conventionally situated in such a way that the fluid which flows through the valve must also flow through the filter so as to be filtered thereby.

However, one of the most serious drawbacks encountered with conventional assemblies of this type resides in the fact that the filtered matter collects on the filter, providing a gradually increasing resistance to the flow of fluid, and of course from time to time it is necessary to remove the filter and clean it so that it can then be replaced to permit the operation of the valve to be resumed.

The result is that frequent interruptions in the operation of the valve are required so that the filter can be removed and cleaned, and between these interruptions there is an undesirable build-up of filtered matter situated directly in the path of fluid flow and creating a resistance to fluid flow which greatly decreases the efficiency of the valve assembly.

SUMMARY OF THE INVENTION

It is accordingly a primary object of the present invention to provide a valve assembly which will avoid the above drawbacks.

In particular, it is an object of the present invention to provide for a valve assembly a filter arrangement which will enable the valve assembly to operate for a long period of time without requiring interruptions in the operation for the purpose of cleaning the filter with the frequency which has been conventionally required up to the present time.

Thus, it is an object of the present invention to provide a valve assembly with a filter arrangement which makes it possible for the structure to operate for a far longer period of time with a high degree of efficiency than has heretofore been possible with conventional constructions.

It is also an object of the present invention to provide for a structure of the above type an arrangement which makes it possible to remove filtered matter from the valve assembly without removing the filter itself, so that in a rapid and highly convenient manner it is possible to displace filtered matter out of the valve assembly with a very minor interruption in the operation.

Yet another object of the present invention, however, resides in providing for a structure of the above general type an arrangement which makes it possible to very quickly remove the entire filter when required and to replace it in an extremely rapid and convenient manner.

According to the invention the valve assembly includes an elongated tubular means having opposed inlet and outlet ends and defining for a fluid which flows through the tubular means a predetermined path of flow. Within the tubular means, between its opposed ends, is located a valve seat which surrounds the path of flow, and a valve member coacts with the valve seat, a moving means being operatively connected with the valve member for displacing it to and from a closed position engaging the valve seat, so that in this way the flow of fluid can be controlled. A filter means extends across the interior of the tubular means for filtering the fluid flowing therethrough, and this filter means has an upstream surface toward which the fluid flows and a downstream surface away from which the fluid flows after passing through the filter means, this filter means being situated also between the opposed ends of the tubular means. A housing means is carried by the tubular means and communicates with the interior thereof, and this housing means has an inner collecting chamber extending to an elevation lower than and communicating with the upstream surface of the filter means, so that filtered matter which deposits on the upstream surface of the filter means can drop from this upstream surface by gravity into the collecting chamber to be collected therein while being situated beyond the path of fluid flow determined by the tubular means.

BRIEF DESCRIPTION OF DRAWING

The invention is illustrated by way of example in the accompanying drawing which form part of this application and in which there is illustrated in a longitudinal sectional elevation, taken in a central plane which contains the axis of the valve assembly, one possible embodiment of a valve assembly according to the invention.

DESCRIPTION OF A PREFERRED EMBODIMENT

Referring now to the drawing, the valve assembly 10 illustrated therein includes an elongated tubular means 12 having an inlet end 14 and an outlet end 16. At its inlet and outlet ends the tubular means 12 is provided with suitable flanges which enable the valve assembly 10 to be connected into a pipe through which a fluid such as a liquid flows. It will be noted that the flanges 18 and 20 respectively situated at the inlet and outlet ends 14 and 16 extend in substantially vertical planes while the elongated tubular means 12 itself is positioned substantially horizontally, so that in this way the elongated tubular means 12 provides a substantially horizontal path of fluid flow for the fluid, as indicated by the arrows in the drawing. Also it is possible to arrange the flanges 18 and 20 in horizontal planes with inlet 14 over outlet 16 so that the fluid flows downwardly.

In the interior of the tubular means 12, between its opposed inlet and outlet ends 14 and 16, is a circular valve seat 22 which surrounds the path of fluid flow. A valve member 24 coacts with the valve seat 22, and a moving means 26 is operatively connected with the valve member 24 for moving the latter toward and away from the closed position illustrated in the drawing, so that in this way the flow of the fluid can be controlled. In the closed position illustrated in solid lines in the drawing the flow of fluid will of course be interrupted. However, the moving means 26 can displace the valve member 24 to the dot-dash line position illustrated for the purpose of opening the valve and providing a selected rate of fluid flow.

The moving means 26 takes the form of a rotary stem 28 having an upper end 30 rotatable within a bore formed in the valve member 24 and retained therein by a ring 32, so that while the stem 28 can turn with respect to the valve member, the valve member 24 and the stem 28 are not axially movable with respect to each other.

The valve seat 22 forms part of a spider assembly 34 which has threads 36 by means of which it is threaded into corresponding threads formed in the tubular means 12. At the region of the threads 36 and the valve seat 22 the spider assembly 34 is of a circular configuration. At its upper end the spider assembly 34 carries a pair of cross bars 38 which support at their inner ends a sleeve 40 through which an elongated valve stem 42 slidably extends, this stem being integral with the valve member 24.

Opposite the bars 38 the spider assembly 34 has a pair of yoke members 44 which are integral with the circular portion of the assembly 34 which has the valve seat 22, and these yoke members 44 carry a sleeve 46 situated at the lower end of the spider assembly and being formed with internal threads coacting with the threads 48 of the rotary stem 28. Thus when the stem 28 is turned it will move axially with respect to the spider assembly 34 as a result of the threaded connection at the sleeve 46, and in this way the valve member 24 will be axially moved for controlling the flow of fluid.

An elongated generally cylindrical housing means 50 is integral with the tubular means 12 and extends downwardly therefrom while being inclined with respect to the path of fluid flow at approximately an angle of 45° in the downstream direction, as illustrated in the drawing. This tubular housing 50 carries at its bottom end a closure wall 52 fixed by screw means 54 to a flange 56 at the lower end of the housing means 50. The closure wall 52 of the housing means 50 is formed with a central opening through which the rotary screw 28 of the moving means 26 extends, and a sealing ring 58 is carried by the closure wall 52 surrounding the rotary screw 28. Downwardly beyond the closure wall 52 the rotary member 28 fixedly carries a handle 60 so that the operator can turn the stem 28 for displacing the valve and when the handle 60 has the illustrated dot-dash line position the valve member 24 will be located in the corresponding dot-dash line position while when the handle 60 has the solid line position shown in the drawing the valve member 24 will be located in its illustrated closed position.

Situated in the interior of the tubular means 12, extending across the path of fluid flow, is a filter means 62 which in the illustrated example takes the form of an elongated cylinder formed with perforations or taking the form of a screen mesh which has the illustrated cylindrical configuration. This filter means 62 extends across the interior of the tubular means and has an upstream surface 64 toward which the fluid flows and a downstream surface 66 away from which the fluid flows after passing through the filter means. Thus any matter filtered out by the fluid by the filter means 62 will initially become deposited on the upstream surface 64.

The lower portion of the housing means 50, which communicates with the interior of the tubular means 12, forms a collecting chamber 68 into which matter filtered out of the fluid by the filter means can drop by gravity, this collecting chamber 68 not only communicating with the upstream surface 64 of the filter means 62 but also extending to an elevation substantially lower than the upstream surface 64. Thus the arrangement is such that as material is deposited on the upstream surface 64 it will gradually settle down into the collecting chamber 68 to prevent an undesirably large build-up of filtered matter at the filter means 62, and in this way the filter means 62 can operate for a long period of time with a high efficiency both with respect to its filtering action and with respect to the fact that it will not provide an undesirable resistance to the flow of fluid.

The closure wall 52 carries a removable plug 70 which maybe removed from time to time to give access to the collecting chamber 68 so that collected matter can be removed therefrom without removing the filter means 62. Thus after a fairly long period of time the flow of fluid can be interrupted in order to remove the plug 70 and with or without backflush clean out the matter which has collected in the collecting chamber 68, after which the plug 70 is replaced and the operations resumed. Also plug 70 can be removed while the valve is open for pushing dirt out under the pressure of the fluid.

It will be noted that the filter means 62 which is of a cylindrical configuration has an upper open end surrounding the valve seat 62 and being coaxial therewith. This upper open end is held between the spider assembly 34 and a circular surface formed at the interior of the housing means 50 where this surface forms a shoulder to be engaged by a corresponding shoulder of the spider 34. The valve member 24 itself is surrounded by the filter means 62 and the yokes 44 as well as the threaded sleeve 46 and the stem 28 all extend along the interior of the cylindrical filter means 62 with the valve member 24 and the stem 28 being coaxially arranged with respect to the cylindrical filter means 62.

Moreover, the closure member 52 of the housing means 50 is formed with a shoulder which supports the filter means 62 at its lower open end, so that whenever it is desired to remove the filter means 62 it is only necessary, after interrupting the flow of fluid through the valve means 10, to remove the handle 60 and the closure wall 52. Through these simple operations it becomes possible to immediately have access to the filter 62 so as to remove it from the interior of the housing means 50 and replace it either with a new filter or to clean it and replace it, and simple by replacing the closure wall 52 and the handle 60, the parts are again placed in an operative condition.

Furthermore, it will be noted that if the handle 60 is turned to rotate the stem 28 so as to place the valve member 24 in its closed position, the spider assembly 34 can remain assembled with the tubular means 12 and the flow of fluid through and beyond the valve seat 22 will be reliably prevented. Therefore when the valve member 24 is positioned in its closed position, it is possible to remove the handle 60 and the closure wall 52, and the filter can be removed and replaced in the manner described above, so that it becomes unnecessary to actuate a separate valve upstream of the valve assembly of the invention in order to close off the flow of fluid to provide for access to the filter means.

Thus, the arrangement of the housing means and filter means so that they are situated substantially in their entirety downstream of the valve seat 22 provides for interruption of the flow of fluid into the housing means when access is desired either to the collecting chamber 68 or to the filter 62 itself. Moreover, the extension of the housing means to an elevation below the surface 64 enables the filtered matter to collect in the collecting chamber 68 beyond the path of fluid flow so as to provide for maintenance of a highly efficient flow of fluid without continuously increasing resistance.

It will be noted that except for the inlet 14 and the outlet 16, the only other opening in the entire assembly is the opening at the lower end of the housing means 50. Thus, by removal of the closure wall 52 it is possible to remove through the opening at the lower end of the housing means 50 not only the filter but also the entire valve mechanism so that through this one opening at the lower end of the housing means 50 it is possible to introduce and remove the entire valve and filter assembly carried by the tubular means.

Of course, since the filtered matter will initially become deposited on the upstream surface 64 of the filter means 62 after the fluid flows into the filter means through its upper open end, it is possible from time to time simply to reverse the flow of fluid so as to wash the collected matter away from the surface 64 and permit it to settle into the collecting chamber 68, so that through this simple expedient the operations can be maintained for an even longer period of time.

What is claimed is:

1. A valve assembly comprising elongated tubular means having opposed inlet and outlet ends and defining for a fluid a predetermined path of flow, a valve seat carried by said tubular means in the interior thereof between said ends and surrounding the predetermined path of flow defined by said tubular means, a valve member movable toward and away from said seat, moving means coacting with said valve member for displacing the latter to and from a closed position engaging said seat, for controlling the flow of fluid along said path, filter means extending across the path of fluid flow in said tubular means for filtering a fluid flowing therethrough, said filter means having an upstream surface toward which the fluid flows and a downstream surface away from which the fluid flows after having passed through said filter means, and housing means communicating with the interior of said tubular means and having an interior collecting chamber communicating with said upstream surface of said filter means and extending to an elevation lower than said upstream surface of said filter means for collecting matter filtered out of the fluid by said filter means when the matter falls by gravity from said upstream surface of said filter means downwardly in said collecting chamber, said housing means having a lower end formed with an opening through which said valve seat, valve member, moving means, and filter means may be introduced into and removed from said tubular means, and said housing means removably carrying a closure wall which normally closes said opening at said lower end of said housing means and through which said moving means extends to the exterior of said housing means.

2. The combination of claim 1 and wherein said filter means includes a wall portion extending across tubular means at a portion thereof situated downstream of said valve seat between said valve seat and said outlet end of said tubular means.

3. The combination of claim 2 and wherein said filter means is of a cylindrical configuration and is coaxial with said valve seat, said filter means having one end surrounding said valve seat.

4. The combination of claim 3 and wherein said cylindrical filter means has a lower end distant from said valve member, said closure wall covering the lower end of said filter means.

5. The combination of claim 4 and wherein said closure wall of said housing means carries a plug which may be removed for displacing matter which collects in said collecting chamber out of the latter.

6. The combination of claim 1 and wherein said tubular means supports said valve seat at an angle of approximately 45° with respect to the path of fluid flow, said housing means extending from said tubular means in a downstream direction substantially at an angle of 45° with respect to the path of fluid flow determined by said tubular means, and said filter means being cylindrical and positioned within said housing means, said filter means having an upper open end into which the fluid flows after passing through said valve seat, said upstream surface of said filter means forming an inner surface of the cylindrical filter means.

7. The combination of claim 6 and wherein a spider is fixed to and extends from said valve seat in the interior of said cylindrical filter means, said moving means including a rotary valve stem rotatably connected with said valve member and having a threaded connection with said spider, said stem extending through said housing means to the exterior thereof and carrying at the exterior of said housing means a handle for displacing said valve member with respect to said valve seat.

8. The combination of claim 7 and wherein said valve member fixedly carries at the side of said valve member opposite from said moving means a second stem coaxial with said rotary valve stem of said moving means, said valve seat carrying at the side of said valve member opposite from said first-mentioned spider a second spider guiding said second valve stem for movement.

9. The combination of claim 1 and wherein said inlet and outlet ends of said elongated tubular means have a common axis and said valve seat being located adjacent said common axis so that the path of fluid flow is deflected from said common axis only to a small extent when the fluid flows through the predetermined path surrounded by said valve seat.

* * * * *